US006804050B2

(12) United States Patent
Parks

(10) Patent No.: US 6,804,050 B2
(45) Date of Patent: Oct. 12, 2004

(54) MULTIPLE PHASE CONTRAST ANNULUS SLIDER

(75) Inventor: Scott W. Parks, East Amherst, NY (US)

(73) Assignee: Leica Microsystems Inc., Depew, NY (US)

(*) Notice: Subject to any disclaimer, the term of this patent is extended or adjusted under 35 U.S.C. 154(b) by 19 days.

(21) Appl. No.: 10/328,322

(22) Filed: Dec. 23, 2002

(65) Prior Publication Data
US 2004/0120030 A1 Jun. 24, 2004

(51) Int. Cl.[7] .......................... G02B 21/06; G02B 21/00
(52) U.S. Cl. ...................... 359/388; 359/368; 359/387
(58) Field of Search ................................ 359/368–390; 351/200–246

(56) References Cited

U.S. PATENT DOCUMENTS

| 4,407,569 A | * | 10/1983 | Piller et al. ............... 359/370 |
| 4,487,486 A | * | 12/1984 | Hayasaka .................. 359/387 |
| 4,756,611 A | | 7/1988 | Yonekubo et al. .......... 359/368 |
| 4,807,980 A | | 2/1989 | Dietrich et al. ............ 359/368 |
| 5,032,011 A | | 7/1991 | Muchel .................... 359/385 |
| 5,128,808 A | * | 7/1992 | Dosaka ..................... 359/821 |
| 5,371,624 A | | 12/1994 | Nagano et al. ............. 359/389 |
| 5,706,128 A | * | 1/1998 | Greenberg ................. 359/385 |
| 6,181,491 B1 | * | 1/2001 | Sano et al. ................ 359/824 |
| 6,219,180 B1 | * | 4/2001 | Hasegawa et al. .......... 359/387 |
| 6,373,626 B1 | * | 4/2002 | Tanaka et al. ............. 359/390 |
| 6,437,912 B2 | * | 8/2002 | Shiba et al. ............... 359/383 |
| 6,479,807 B1 | * | 11/2002 | Toshimitsu ............... 250/201.3 |

* cited by examiner

Primary Examiner—Thong Q Nguyen
(74) Attorney, Agent, or Firm—Simpson & Simpson, PLLC

(57) ABSTRACT

The present invention broadly comprises a device, such as a slider, for performing phase contrast microscopy, the device containing a plurality of at least three phase contrast annuli. The slider is received into a microscope condenser mounted under a microscope stage and that is adapted to receive the device and align the device such that a phase contrast annulus is aligned with an appropriate microscope objective phase ring. The invention also comprises printed or engraved indicators or other markings indicating whether the bright field aperture or a particular phase contrast annulus is in position in the illumination path of the microscope. The invention further comprises a device for preventing the removal of the device from the condenser.

40 Claims, 6 Drawing Sheets

MULTIPLE PHASE CONTRAST ANNULUS SLIDER

FIELD OF THE INVENTION

The present invention relates generally to microscopy, more specifically to phase contrast microscopy, and, even more particularly, to a multiple phase contrast annulus slider for a microscope.

BACKGROUND

As is well known, a microscope is an optical instrument used to view, examine and study very small objects. There are many different types of microscopes, each best suited to particular applications. These include compound microscopes, stereomicroscopes, confocal microscopes, inverted microscopes, laser microscopes, fluorescence microscopes and polarizing microscopes, to name but a few.

The present invention relates generally to compound microscopes and to those compound microscopes that are equipped to carry out phase contrast microscopy.

A variety of removable components are frequently used with compound microscopes to illuminate the object being investigated with diverse types of light. Components of this type include phase rings that create phase shifts in the light illuminating an object being investigated. Phase shifts of this type take advantage of differential diffraction of light as it passes through transparent objects such as single cell organisms to allow objects under study that are invisible under bright field conditions to become visible to the microscope user. This form of microscopy is called phase contrast microscopy.

It is well known in the art that in phase contrast microscopy, a pair of phase rings is used to create the phase shift. One ring is usually positioned within the microscope objective at the image plane near the nosepiece, while the other phase ring, commonly called a phase contrast annulus or simply, an annulus, is placed between the light source and the condenser. For each microscope objective having a different magnification, a different phase ring/annulus pair must be placed into the light path.

Because the phase rings located on a phase contrast objective are permanently positioned so as to be to be automatically brought into proper alignment in the illumination beam path, there is no difficulty in always selecting the correct objective phase ring for the desired magnification. However, one difficulty created by the necessity of using different pairs of phase rings for different magnifications is the need to change the phase contrast annulus positioned between the light source and the condenser. Because the phase contrast annulus is positioned underneath the microscope stage, it is awkward to determine if the correct annulus is being used for a particular magnification.

An additional problem in using phase contrast microscopes is that the phase ring/annulus pair must be changed with each change in magnification. The phase ring is automatically correctly switched when the desired objective is placed into position. However, the annulus is commonly changed by inserting into and removing from the condenser components that hold a single annulus appropriate for the desired magnification. This results in unused phase contrast annuli being exposed in a loose manner at a work station where they can be easily lost or damaged. This is especially true in educational settings in which the user may be an inexperienced student who may be performing a variety of exercises requiring an array of different phase rings in a limited period of time. This problem can also exist in a clinical setting where different tests and procedures may require frequent changes of phase contrast annuli as different magnifications are used. Alternatively, phase contrast annuli may be mounted on a turret attached to a microscope condenser which allows the user to turn the phase ring into position. However, such turret-condenser assemblies are expensive and require a final adjustment of the annulus after it is turned in order to align the annulus with the objective phase contrast ring.

Others have disclosed sliders for supporting and positioning components into the illumination path of a compound microscope. Sliders currently exist that either hold two phase contrast annuli or hold a single phase contrast annulus and define a bright field aperture. In addition, U.S. Pat. No. 4,756,611 to Yonekubo, et al. discloses a turret having multiple phase contrast annuli as well as other light altering elements commonly used in light microscopy. U.S. Pat. No. 4,807,980 to Dietrich discloses a condenser with an element that pivots a light filter or similar element into the illumination path of a compound microscope. Only one element is contained in the pivot arm of the '980 patent. U.S. Pat. No. 5,032,011 to Muchel describes a condenser possessing a space that can accept a slider or a turret containing phase contrast rings or other light microscopy components. U.S. Pat. No. 5,371,624 to Nagono, et al. discloses a slider defining a bright field opening and holding two equal size fluorescent light filters used in fluorescent microscopy.

None of the above disclosures depict a slider possessing phase contrast annuli for all objectives commonly found on phase contrast microscopes. What is needed then is a device that is capable of holding phase contrast annuli for low, medium and high magnifications typically found on a compound microscope in an educational or clinical setting. Preferably, such a slider will be of such a length as to not extend beyond the outline of the microscope stage while still holding three phase contrast annuli as well as a bright field aperture. In addition, there is a need for a mechanism for removably securing a slider in the condenser while still allowing it to slide freely to position the desired annulus into proper alignment in the illumination beam path.

SUMMARY OF INVENTION

The present invention broadly comprises a device, such as a slider, for performing phase contrast microscopy, the device containing a plurality of at least three phase contrast annuli. The device is received into a microscope condenser mounted under a microscope stage and that is adapted to receive the device and align one of the phase contrast annuli with the appropriate objective phase ring without the need for a final alignment.

The invention also comprises printed or engraved indicators or other markings indicating whether the bright field aperture or a particular phase contrast annulus is in position in the illumination path of the microscope. The invention further comprises a mechanism for preventing the removal of the device from the condenser.

A general object of the invention is to provide a device, such as a slider, capable of holding a plurality of at least three phase contrast annuli in addition to a bright field aperture.

A second object of the invention is to provide a device capable of holding a bright field aperture with a plurality of at least three phase contrast annuli.

An additional object of the invention is to provide a device having a handle to enable easy movement of the device within the condenser.

An additional object of the invention is to disclose a device with indicia designating whether a bright field aperture or one of a plurality of phase contrast annuli is positioned in the illumination path of the microscope.

A further object of the invention is to disclose a component designed to prevent the device from being removed from the condenser of a compound microscope.

A further object of the invention is to provide a device configured to correctly align a phase contrast annulus contained on the device with an appropriate objective phase ring without the use of a final alignment.

A still further object of the invention is to minimize the area on a device, such as a slider, needed to hold a plurality of phase contrast annuli.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments.

The present invention broadly comprises a microscope assembly including a microscope having a base mounted illuminator, a condenser mounted below the stage of a microscope and having a space to receive a device containing optical elements. In the embodiment shown in FIG. 1, the condenser is adapted to receive a slider. The slider is positioned within the condenser to place one of the optical elements in the illumination path of the microscope. A conventional compound microscope is shown in perspective view in FIG. 1. Although the invention is suitable for use with a variety of light microscopes, it is useful to review basic microscope structure and function to appreciate the present invention.

Figure 1:
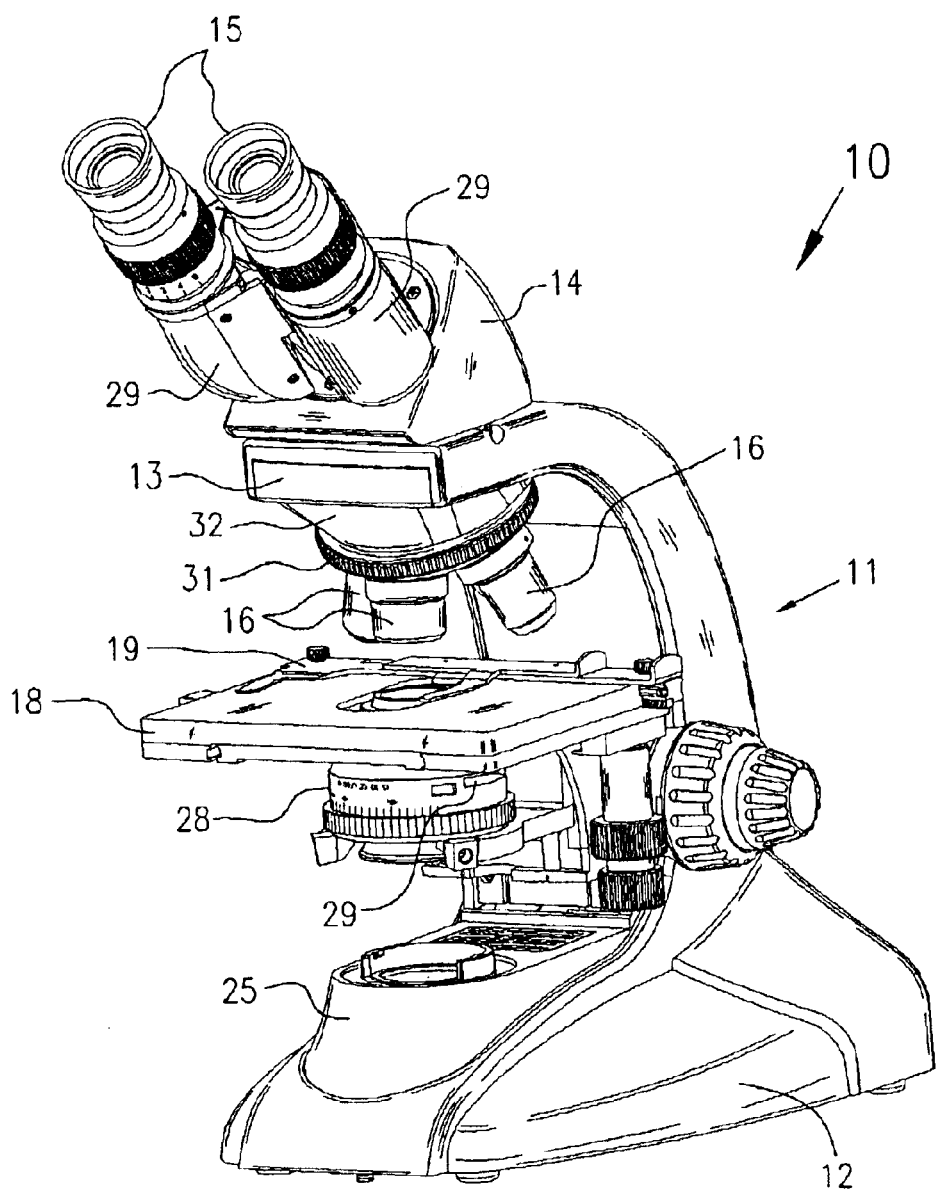
FIG. 1 is a perspective view of a typical compound microscope adaptable for use with the multiple phase contrast annulus slider of the present invention.

FIG. 1 illustrates compound microscope 10. The microscope includes mounting stand 11 which includes base 12 and eyepiece/objective mounting platform 13. Viewing body 14 is mounted to a top surface of mounting stand 11. In the embodiment shown, the viewing body is binocular, comprising two eyepieces 15 mounted in eye tubes 29. The viewing body is not germane to the invention, which is suitable for use with a microscope configured with any type of viewing body (monocular, binocular, trinocular, video, etc.). Objectives 16 are mounted to turret 31. Turret 31 is rotatably mounted to nosepiece 32, which in turn is mounted to a bottom surface of mounting stand 11. The microscope includes stage 18 upon which a specimen to be viewed is placed. Slide mount 19 is incorporated into stage 18 and enables movement of a slide (not shown) holding the specimen to be viewed. Illuminator 25 is mounted in base 12 of microscope 10. Illuminator 25 provides a controllable source of light to illuminate the specimen as is well known in the art. In the several drawing views of the invention, a critical type illumination is shown, although the invention is suitable for use with other illumination configurations as well. Light from illuminator 25 travels in a beam upwardly through condenser 28, which functions to gather and focus the light. As described below, slot 29 receives the present invention into condenser 28.

Figure 2:
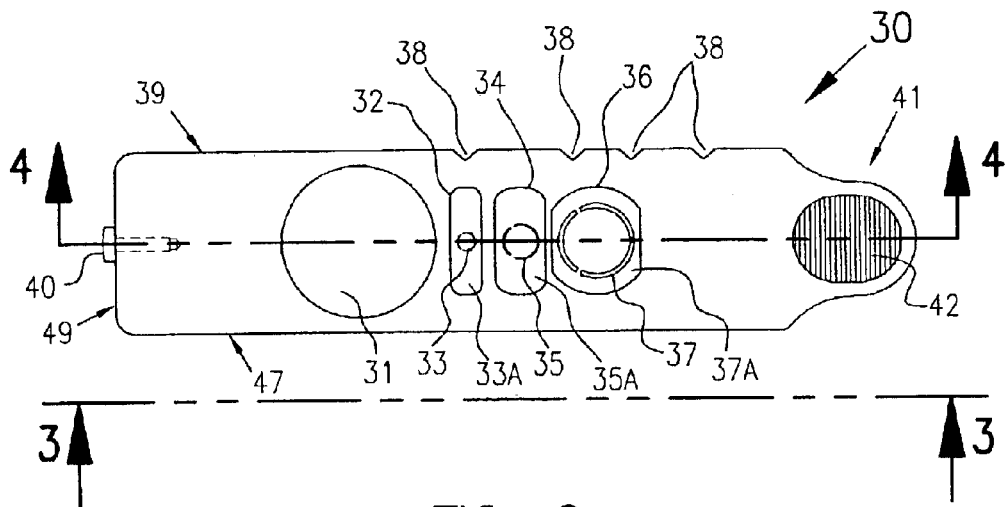
FIG. 2 is a top view of the multiple annulus slider of the present invention.

FIG. 2 is a top view of multiple annulus slider 30 of the present invention. Slider 30 defines phase contrast apertures 32, 34, and 36 that are defined by slider 30 and pass through slider 30. In a preferred embodiment, as seen in FIG. 2, slider 30 further defines bright field aperture 31 which is placed in the illumination beam path when it is desired to use bright field microscopy. Phase contrast aperture 32 supports low magnification annulus 33. Low magnification annulus 33 is typically used with 10× or 20× objectives. Phase contrast aperture 34 supports medium magnification annulus 35. Medium magnification annulus 35 is typically used with 40× objectives. Phase contrast aperture 36 supports high magnification annulus 37. High magnification annulus 37 is typically used with 100× objectives. In a preferred embodiment, as depicted in FIG. 2, phase contrast annuli 33, 35, and 37 are comprised of arcs cut out of support material 33A, 35A, and 37A, respectively, and formed into a circular or ring configuration. Support material 33A, 35A, and 37A is set into and supported by the sides of phase contrast apertures 32, 34, and 36, respectively. The support material may be blackened brass or other suitable material known in the art. Other annuli suitable for use with phase contrast objectives having different magnifications are well known to those skilled in the art.

In a preferred embodiment, phase contrast apertures 32, 34, and 36 will have a width larger than the diameter of the ring or circle configuration of the phase contrast annuli. As seen in FIG. 2, phase contrast apertures 33, 35, and 37 have an elongated shape with a length l in which l is greater than w. Each one of a plurality of phase contrast apertures may have other shapes including rectangles, ellipses, or oblong configurations with the object of minimizing the area within which the plurality of phase contrast apertures are contained. In this preferred embodiment, the formula w>d is used to describe the shape of a phase contrast aperture wherein w is the width of the aperture and d is the diameter of the phase contrast annulus supported by the annulus.

Notches 38 are cut into side 39 ot slider 30. Notches 38 are spaced along side 39 such that they act as guide stops when contacting stop guide rod 48. (See FIGS. 5A–5D.) The spacing of notches 38 enables bright field aperture 31 or one of annuli 33, 35, and 37 to be positioned correctly within the illumination path of microscope 10. In a preferred embodiment, handle 41 extends from slider 30 at one end of slider 30. Handle 41 may be attached to slider 30 using screws, rivets, adhesives or other attachment means known in the art. In a more preferred embodiment, handle 41 is integral with slider 30 as seen in FIG. 2. In a most preferred embodiment, handle 41 includes pads 42. Pads 42 are attached to both surfaces of slide 30 and are preferably fabricated from a non heat-conducting material such as plastic. More preferably, pads 42 are shaped such that they prevent slide 30 from being withdrawn completely through slot 29 in condenser 28. In a preferred embodiment, slider 30 contains an additional mechanism preventing it from being withdrawn from condenser 28. More preferably the additional mechanism will be removably secured to slider 30. Most preferably, stop screw 40 is removably secured into side 49 of slider 30 to prevent removal of slider 30 through condenser 28. Side 49 is inserted into slot 29 of condenser 28 so as to extend through condenser 28. Stop screw 40 is then removably secured into side 49 of slider 30 to prevent slider 30 from being withdrawn through slot 29.

Figure 3:
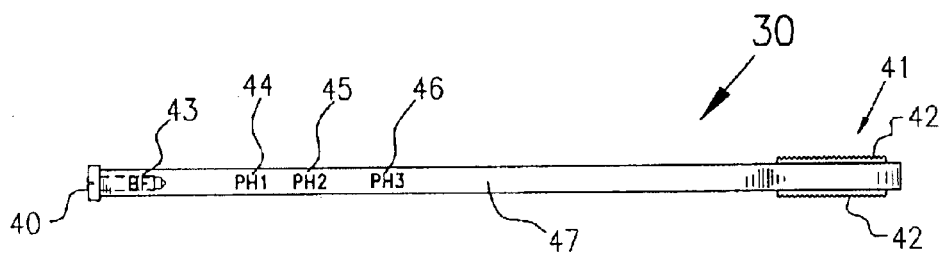
FIG. 3 is a side view of the multiple annulus slider of the present invention taken along line 3—3 of FIG. 2.

FIG. 3 shows a side view of slider 30. One of pads 42 is attached to each surface of handle 41. Stop screw 40 is shown inserted into slider 30. Indicators 43, 44, 45, and 46 are displayed on side 47 of slider 30. As described below, indicators 43, 44, 45, and 46 indicate to the operator which aperture or annulus is positioned in the illumination beam path. Alternatively, indicators 43, 44, 45, and 46 may be placed on the top surface of slider 30 or on the same side as notches 38.

Figure 4:
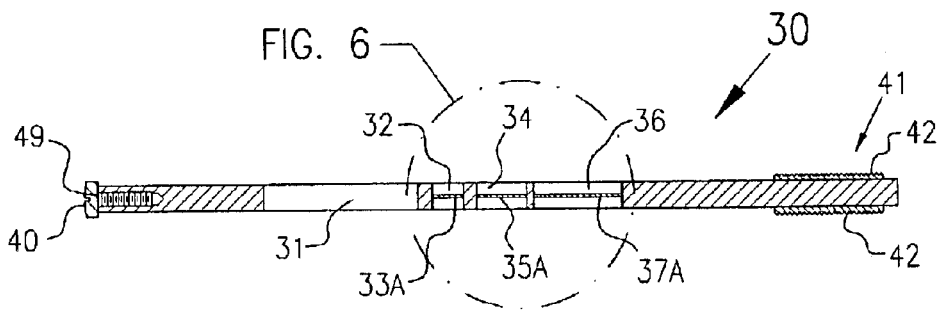
FIG. 4 is a cross-section view of the multiple annulus slider of the present invention taken along line 4—4 of FIG. 2.

FIG. 4 is a cross-section of slider 30 taken along line 4—4 of FIG. 2 depicting the placement of annuli 33, 35, and 37 in phase contrast apertures 32, 34, and 36, respectively. As can be seen in FIG. 4, the support material 33A, 35A, and 37A is supported within phase contrast apertures 32, 34, and 36, respectively. The blackened brass or other opaque material from which the annuli are formed is supported using LOCTITE® 369 or other similar adhesive well known to those skilled in the art. Also represented in FIG. 4 is bright field aperture 31.

Figure 8:
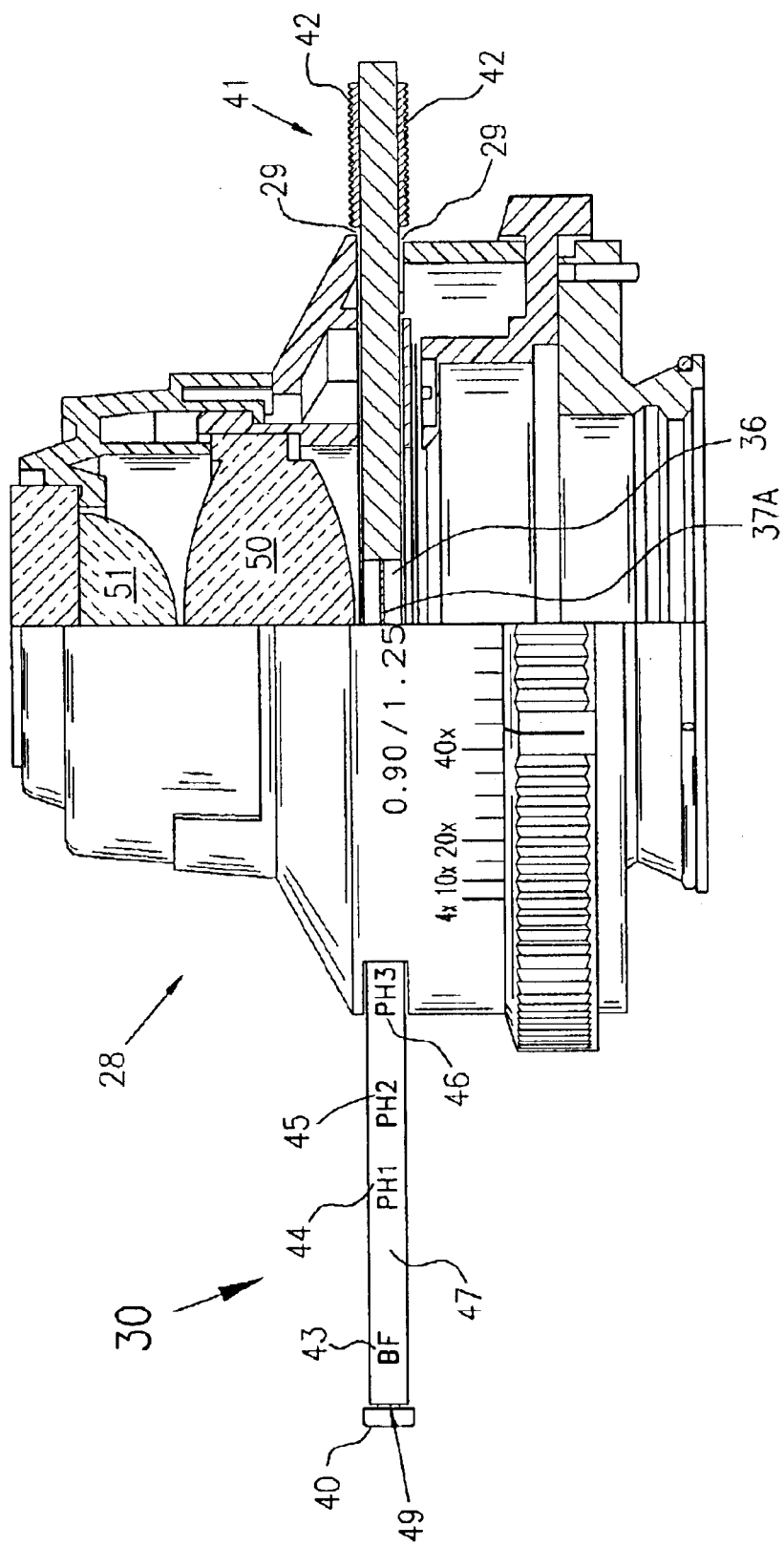
FIG. 8 is a fragmentary cross-section of a condenser-multiple annulus slider assembly taken along line 8—8 in FIG. 7.

FIGS. 5A–5D are top views of slider 30 inserted into condenser 28 (with condenser lens section removed) depicting either bright field aperture 31 or one of annuli 33, 35, or 37 placed into the illumination beam path. In FIGS. 5A–5D, it can be seen that the slider-condenser assembly is constructed to realize correct alignment of bright field aperture 31 or any of the phase contrast annuli 33, 35, or 37 when one of notches 38 contacts stop rod 48 inside condenser 28. Phase contrast annuli 33, 35, and 37 are spaced in relation to notches 38 to be correctly aligned with the appropriate objective phase ring when one of notches 38 contacts stop rod 48. The contact between notches 38 and stop rod 48 is configured in such a manner so as to create a noticeable stop or resistance to the passage of slider 30, while still allowing easy movement of a different notch 38 to stop rod 48 to align a different annulus. As can be seen in FIGS. 5A–5D, different notches 38 contact stop rod 48 to align annuli 33, 35, or 37 as well as bright field aperture 31. It is evident that the irregular spacing of notches 38 is necessary to correctly align bright field aperture 31 and phase contrast apertures 32, 34, and 36 in the illumination beam path as bright field aperture 31 and phase contrast apertures 32, 34, and 36 all differ from each other in width or diameter. As seen in FIG. 3, indicators 43, 44, 45, and 46 are irregularly spaced on side 47 of slider 30 so as to indicate which of the elements on slider 30 is positioned in the illumination beam path. In a preferred embodiment, as seen in FIG. 8, the visible indicator just emerging from condenser 28 indicates which element on slider 30 is in position in the illumination beam path.

Figure 6:
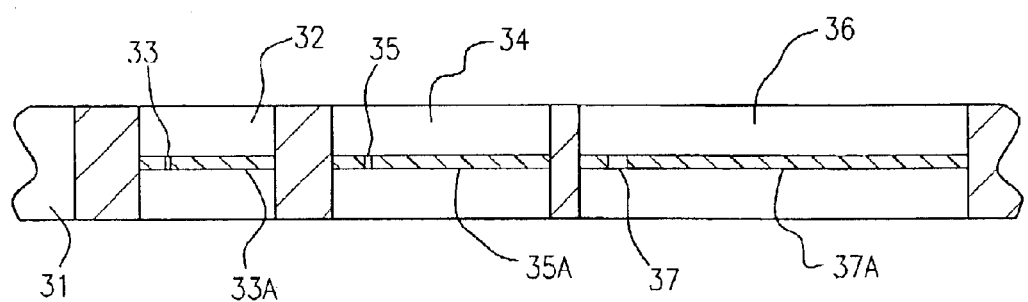
FIG. 6 is an expanded cross-section view of the phase contrast annuli taken from the indicated area of FIG. 4.

FIG. 6 is a magnified cross section of the annuli depicted in FIG. 4. As can be seen in FIG. 6, annuli 33, 35, and 37 are openings defined by support material 33A, 35A, and 37A, respectively. Such support material may be fabricated from brass blackened by using an anodizing process to apply a semi-flat black coating. Other suitable materials and/or processes known in the art may also be used.

Figure 5A:
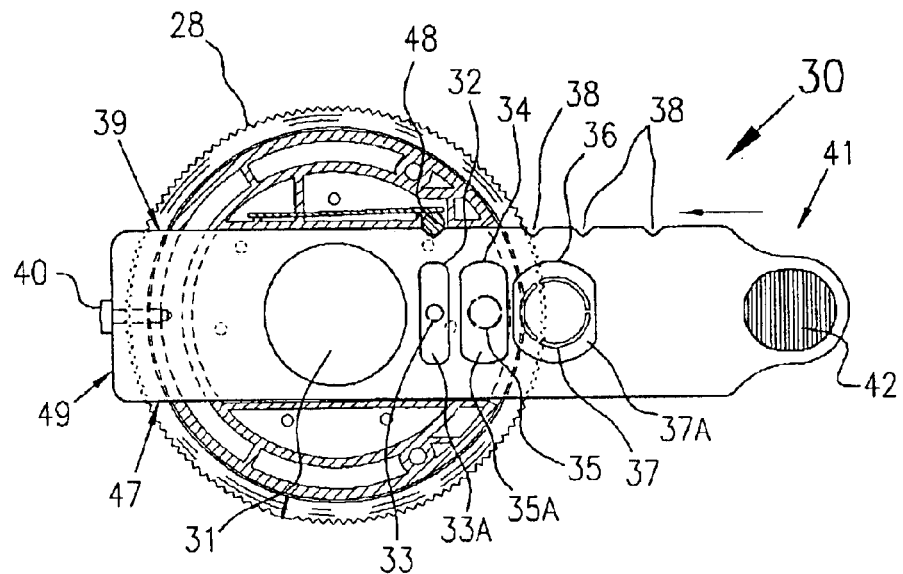
FIGS. 5A–5D are top cross-section views of the multiple annulus slider of the present invention depicting the bright field aperture and each one of the phase contrast annuli in operational position in a condenser with the condenser lens system removed.
Figure 5B:
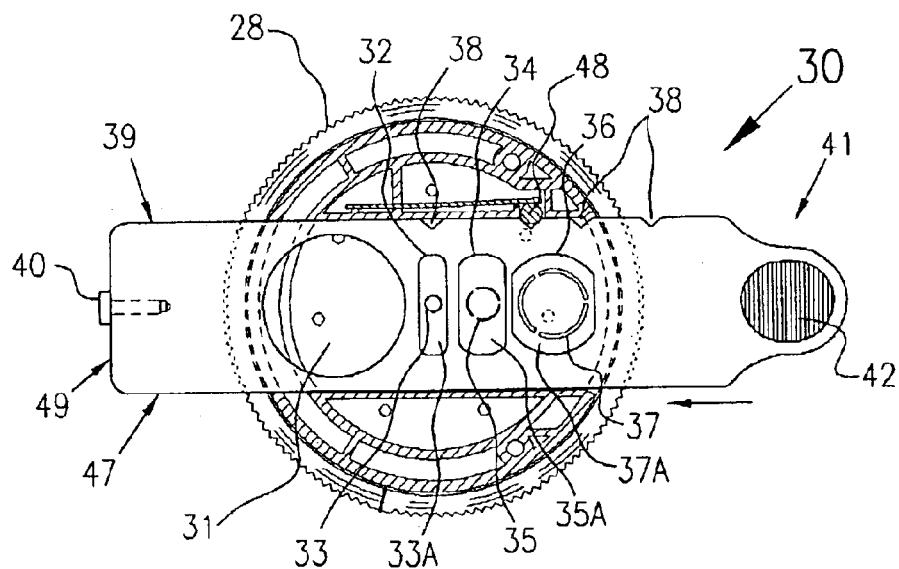
Figure 5C:
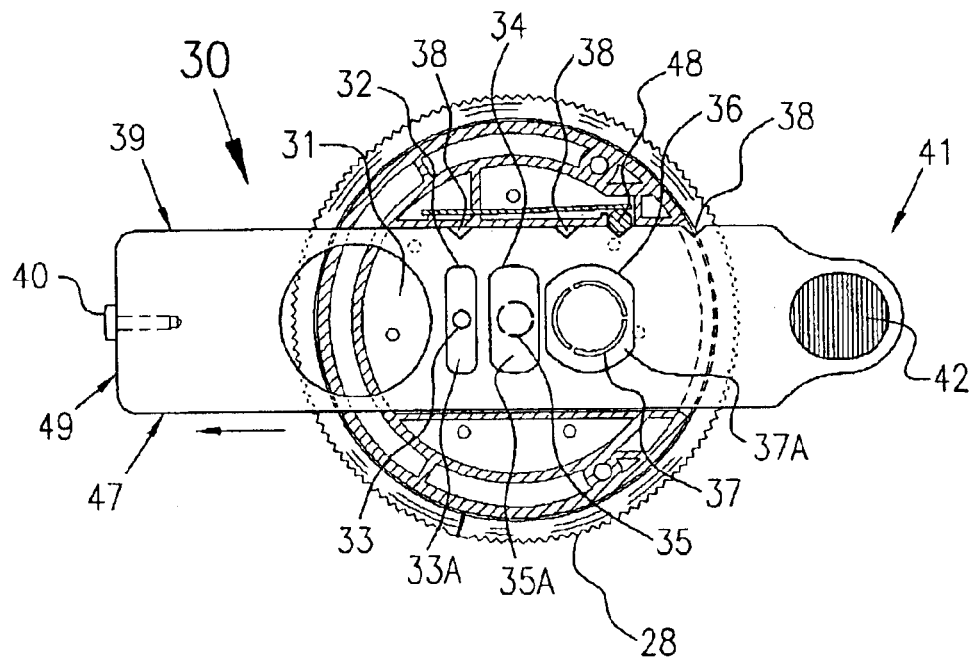
Figure 5D:
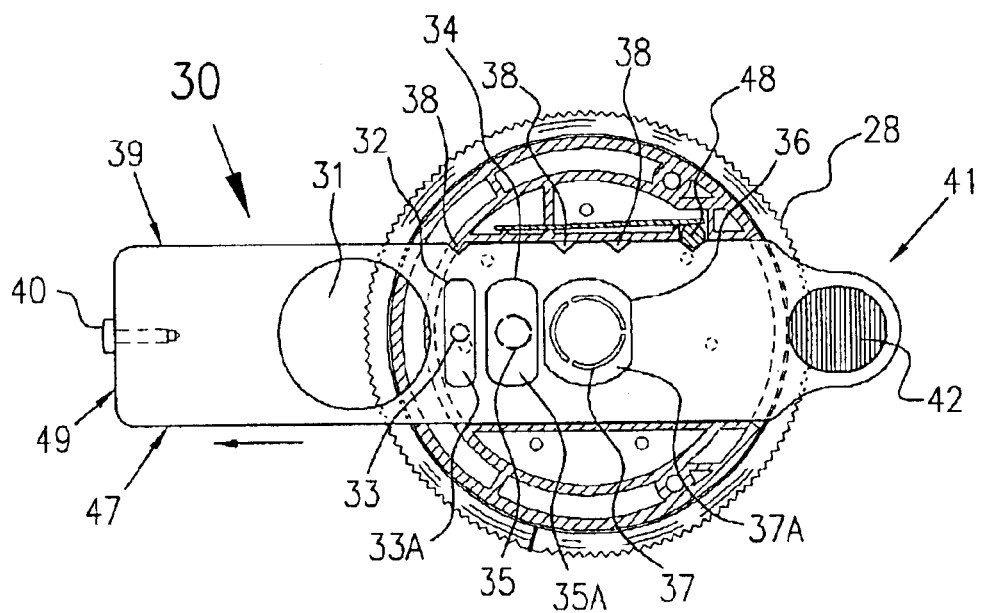
Figure 7:
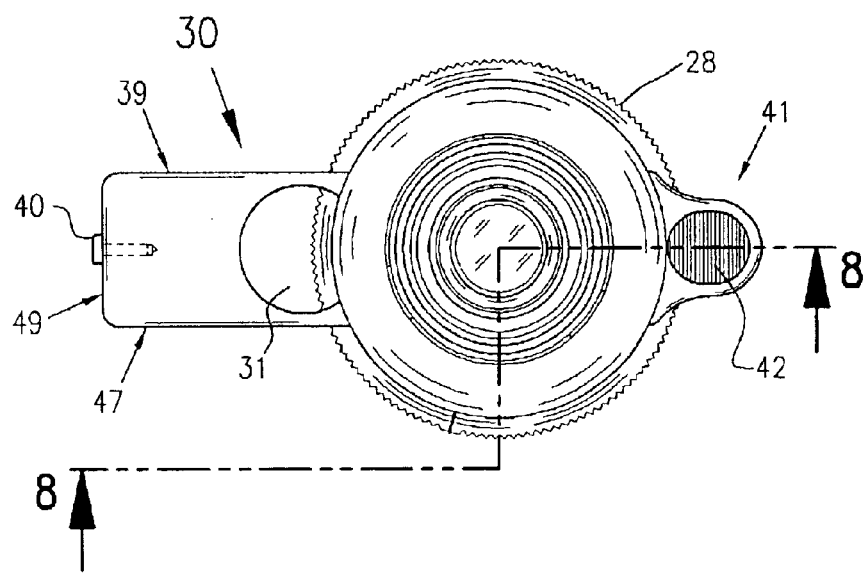
FIG. 7 is a top view of the multiple annulus slider inserted into a condenser.

FIG. 7 is a top view of slider 30 inserted into condenser 28. FIG. 8 is a fragmentary cross-section of condenser 28 taken along line 8—8 in FIG. 7. Condenser 28 receives slider 30 through slot 29. Phase contrast aperture 36 and support material 37A are shown positioned in the illumination beam path under lenses 50 and 51. The position of slider 30 as seen in FIG. 8 is the same as shown in FIG. 5D in which phase contrast annulus 37 is aligned in the illumination path of microscope 10. It can be seen that pads 42 extend above and below the entrance to slot 29 thus preventing slider 30 from being pushed further into or through condenser 28, while stop screw 40 prevents withdrawal of slider 30 from the opposite direction. FIG. 8 depicts a preferred embodiment in which indicator 46, which indicates phase contrast annulus 37 is in positioned in the illumination beam path, is the indicator closest to condenser 28.

Thus it is seen that the objects of the invention are efficiently obtained, although changes and modifications to the invention should be readily apparent to those having ordinary skill in the art, which changes are considered to be within the scope of the invention as claimed. For example, although the invention is shown in combination with a binocular compound microscope, it should be appreciated that the invention is suitable for use with a variety of compound microscopes types and with other optical instruments and devices, such as for example, devices used in photomicrography. Also, in the embodiments of the invention. shown, bright field aperture 31 and phase contrast annuli 33, 35, and 37 may be positioned on slider 30 in a different order than shown above. In addition, as stated above, the apertures or other mounts supporting the phase contrast annuli may have different shapes.

What is claimed:

1. A device for performing phase contrast microscopy, comprising:

a slider;

a bright field aperture in said slider;

a plurality of phase contrast annuli in said slider; and, a plurality of phase contrast apertures wherein one of said plurality of phase contrast annuli is mounted within each of said plurality of phase contrast apertures and wherein each one of said plurality of phase contrast annuli has a diameter d and each one of said plurality of phase contrast apertures has a width w and a length l, wherein a size and shape of each of said phase contrast apertures is determined based on criteria that w>d, and w is minimized.

2. The device recited in claim 1 further comprising a handle integral with said slider.

3. The device recited in claim 2 further comprising at least one pad attached to said handle.

4. The device recited in claim 3 wherein said at least one pad is configured to restrain movement of said handle into a condenser of said microscope.

5. The device recited in claim 1 further comprising a handle secured to said slider.

6. The device recited in claim 5 further comprising at least one pad secured to said handle.

7. The device recited in claim 6 wherein said at least one pad is configured to prevent movement of said handle into a condenser of said microscope.

8. The device recited in claim 1 wherein each of said plurality of phase contrast apertures is elongated in shape.

9. The device recited in claim 1 wherein each of said plurality of phase contrast apertures is oblong in shape.

10. The device recited in claim 1 wherein each of said plurality of phase contrast apertures is rectangular in shape.

11. The device recited in claim 1 wherein each of said plurality of phase contrast apertures is elliptical in shape.

12. The device recited in claim 1, wherein said slider has a first side, and said first side comprises a plurality of notches, each one of said plurality of notches correlated to a position of said slider within a condenser of said microscope.

13. The device recited in claim 12 wherein said notches are spaced unevenly on said first side of said slider.

14. The device recited in claim 1 further comprising at least one phase contrast annulus indicator, said at least one phase contrast annulus indicator indicating one of said plurality of phase contrast annuli is aligned with an optical axis of said microscope.

15. The device recited in claim 14 further comprising a bright field indicator indicating said bright field aperture is aligned with said optical axis of said microscope.

16. The device recited in claim 15, wherein said bright field indicator is positioned on said second side of said slider.

17. The device recited in claim 14 wherein said at least one phase contrast annulus indicator is positioned on a second side of said slider.

18. The device recited in claim 1 further comprising a stop mechanism, said stop mechanism preventing withdrawal of said device from said condenser on said microscope.

19. The device recited in claim 18 wherein said stop mechanism is removably secured to said device.

20. The device recited in claim 19 wherein said stop mechanism is a screw.

21. A device for performing phase contrast microscopy, comprising:

a slider;

a plurality of phase contrast annuli in said slider, said plurality of phase contrast annuli having at least three phase contrast annuli; and, a plurality of phase contrast apertures wherein one of said plurality of phase contrast annuli is mounted within each of said plurality of phase contrast apertures and wherein each one of said plurality of phase contrast annuli has a diameter d and each one of said plurality of phase contrast apertures has a width w and a length l, wherein a size and shape of each of said phase contrast apertures is determined based on criteria that w>d, and w is minimized.

22. The device recited in claim 21 further comprising a handle integral with said slider.

23. The device recited in claim 22 further comprising at least one pad attached to said handle.

24. The device recited in claim 23 wherein said at least one pad is configured to restrain movement of said handle into a condenser of said microscope.

25. The device recited in claim 22, wherein said slider has a first side, and said first side comprises a plurality of notches, each one of said plurality of notches correlated to a position of said slider within a condenser of said microscope.

26. The device recited in claim 25 wherein said notches are spaced unevenly on said one side of said slider.

27. The device recited in claim 22 further comprising at least one phase contrast annulus indicator, said at least one phase contrast annulus indicator indicating one of said plurality of phase contrast annuli is aligned with an optical axis of said microscope.

28. The device recited in claim 27 wherein said at least one phase contrast annulus indicator is positioned on a second side of said slider.

29. The device recited in claim 22 further comprising a stop mechanism, said stop mechanism preventing withdrawal of said device from said condenser on said microscope.

30. The device recited in claim 29 wherein said stop mechanism is removably secured to said device.

31. The device recited in claim 30 wherein said stop mechanism is a screw.

32. The device recited in claim 21 further comprising a handle secured to said handle.

33. The device recited in claim 32 further comprising at least one pad secured to said handle.

34. The device recited in claim 32 wherein said at least one pad is configured to restrain movement of said handle into a condenser of said microscope.

35. The device recited in claim 21 wherein each of said plurality of phase contrast apertures is elongated in shape.

36. The device recited in claim 21 wherein each of said plurality of phase contrast apertures is oblong in shape.

37. The device recited in claim 21 wherein each of said plurality of phase contrast apertures is rectangular in shape.

38. The device recited in claim 21 wherein each of said plurality of phase contrast apertures is elliptical in shape.

39. A device for performing phase contrast microscopy, comprising:

a slider, said slider having a handle;

a plurality of phase contrast annuli within said slider, said plurality having at least three phase contrast annuli;

a bright field aperture within said slider;

at least one phase contrast annuli indicator, said at least one phase contrast annuli indicator indicating one of said plurality of said phase contrast annuli is aligned with an optical axis of said microscope;

at least one bright field indicator, said bright field indicator indicating said bright field aperture is aligned with said optical axis of said microscope;

a stop mechanism, said stop mechanism preventing withdrawal of said device from said condenser on said microscope; and, a plurality of phase contrast apertures wherein one of said plurality of phase contrast annuli is mounted within each of said plurality of phase contrast apertures and wherein each one of said plurality of phase contrast annuli has a diameter d and each one of said plurality of phase contrast apertures has a width w and a length l, wherein a size and shape of each of said phase contrast apertures is determined based on criteria that w>d, and w is minimized.

40. The device as recited in claim 39 further comprising a plurality of notches, each of said plurality of notches correlated to a position of said slider within a condenser of said microscope.

* * * * *